US012792716B2

(12) United States Patent
Bell et al.

(10) Patent No.: US 12,792,716 B2
(45) Date of Patent: Nov. 10, 2026

(54) SYSTEM FOR PERFORMING MULTI-FACTOR AUTHENTICATION UTILIZING A NEAR-FIELD COMMUNICATION (NFC) FROM PHYSICAL ACCESS DEVICE TO ACCESS REMOTE SERVER

(71) Applicant: INTELLIGENT MATERIAL SOLUTIONS, INC., Princeton, NJ (US)

(72) Inventors: Howard Bell, Princeton, NJ (US); Joshua Collins, Wallingford, PA (US); Alexandra Bell, Princeton, NJ (US); Victor E Bell, Princeton, NJ (US); Michael Stout, Princeton, NJ (US); Samuel Grimsby, Princeton, NJ (US)

(73) Assignee: INTELLIGENT MATERIAL SOLUTIONS, INC., Princeton, NJ (US)

( * ) Notice: Subject to any disclaimer, the term of this patent is extended or adjusted under 35 U.S.C. 154(b) by 234 days.

(21) Appl. No.: 18/224,188

(22) Filed: Jul. 20, 2023

(65) Prior Publication Data

US 2024/0028687 A1 Jan. 25, 2024

Related U.S. Application Data

(60) Provisional application No. 63/390,887, filed on Jul. 20, 2022, provisional application No. 63/393,312, filed on Jul. 29, 2022.

(51) Int. Cl.

| | |
|---|---|
| ***G06F 21/35*** | (2013.01) |
| ***G06K 7/14*** | (2006.01) |
| ***H04L 9/08*** | (2006.01) |

(52) U.S. Cl.
CPC ........... *G06F 21/35* (2013.01); *G06K 7/1408* (2013.01); *H04L 9/0825* (2013.01)

(58) Field of Classification Search
CPC ...... G06F 21/35; G06K 7/1408; H04L 9/0825
(Continued)

(56) References Cited

U.S. PATENT DOCUMENTS 9,181,477 B2 11/2015 Collins et al.
9,325,876 B1 * 4/2016 Terrill .................. H04N 23/632
(Continued)

OTHER PUBLICATIONS

Buchmeier, Guilherme Germano et al., "Optimized NFC Circuit and Coil Design for Wireless Power Transfer with 2D Free-Positioning and Low Load Sensibility", Sensors, vol. 21, No. 23, p. 8074, Dec. 2, 2021.

*Primary Examiner* — Moeen Khan
(74) *Attorney, Agent, or Firm* — MEAGHER EMANUEL LAKS GOLDBERG & LIAO, LLP

(57) ABSTRACT

Physical authentication devices and systems using such devices may be provided. A device may include a first substrate having first and second surfaces, and an NFC circuit coupled to the first substrate. The NFC circuit may be configured to transmit first information. The device may include a transparent second substrate coupled to the first surface. The device may include a plurality of rare earth phosphors positioned in or on the substrate, such as within the transparent second substrate or between the first substrate and the transparent second substrate. Each rare earth phosphor may be configured to emit at least one wavelength of light when irradiated with an irradiating wavelength of light, the irradiating wavelength being different from the at least one wavelength of light. In some embodiments, a magnet may be coupled to the second surface. In some embodiments, the transparent second substrate may be adhered to the first substrate.

7 Claims, 5 Drawing Sheets

(58) Field of Classification Search
USPC .............................................................. 726/2
See application file for complete search history.

(56) References Cited

U.S. PATENT DOCUMENTS

| | | | | |
|---|---|---|---|---|
| 9,520,638 | B2 | 12/2016 | Makino et al. | |
| 2012/0233000 | A1* | 9/2012 | Fisher | G06F 16/58 705/14.71 |
| 2016/0125209 | A1* | 5/2016 | Meyers | H04W 4/80 340/10.1 |
| 2016/0367891 | A1* | 12/2016 | Trehan | A63F 13/216 |
| 2021/0166215 | A1* | 6/2021 | Aleksandrov | G06Q 20/40145 |

* cited by examiner

SYSTEM FOR PERFORMING MULTI-FACTOR AUTHENTICATION UTILIZING A NEAR-FIELD COMMUNICATION (NFC) FROM PHYSICAL ACCESS DEVICE TO ACCESS REMOTE SERVER

CROSS-REFERENCE TO RELATED APPLICATIONS

The present application claims priority to US Provisional Patent Application Nos. 63/390,887, filed Jul. 20, 2022, and 63/393,312, filed Jul. 29, 2022, each of which are incorporated by reference herein in its entirety.

TECHNICAL FIELD

The present disclosure is drawn to authentication devices, and multi-factor authentication devices in particular utilizing NFC and phosphor emissions from physical devices.

BACKGROUND

As electronic transactions have become ubiquitous, the need to authenticate such transactions has become ever-more important. Especially when handling transactions relating to cryptographic currencies and non-fungible tokens (NFTs), security has been conventionally handled via use of a cryptographic wallet. However, such wallets inherently rely on remembering (or storing) a master password, and if such password is forgotten or lost, any currency or NFT associated with that wallet is also lost. Further, scams may sometimes result in currency or NFTs being transferred to another individual without such transfer being intended by the owner.

BRIEF SUMMARY

Various deficiencies in the prior art are addressed below by the disclosed compositions of matter and techniques.

A physical authentication device and/or system may be provided for generating public keys for use in encryption. In some embodiments, a physical authentication device may include a first substrate having a first surface and a second surface. In some embodiments, an NFC circuit may be coupled to the first substrate, where the NFC circuit may be configured to transmit first information. In some embodiments, a transparent second substrate may be coupled to the first surface of the first substrate. In some embodiments, a plurality of rare earth phosphors may be positioned within the transparent second substrate or between the first substrate and the transparent second substrate, each rare earth phosphor configured to emit at least one wavelength of light when irradiated with an irradiating wavelength of light (such as a near-infrared (NIR) wavelength), the irradiating wavelength being different from the at least one wavelength of light.

In some embodiments, each rare earth phosphors may be positioned randomly within the entire volume of the transparent second substrate, or within less than the entire volume of the transparent second substrate. In some embodiments, each rare earth phosphors is positioned randomly between the first substrate and the transparent second substrate.

In some embodiments, the first surface of the first substrate is substantially flat and the transparent second substrate is an acrylic cabochon with a convex obverse and a flat reverse, the flat reverse facing the first surface. In some embodiments, the first surface of the first substrate is substantially flat and the transparent second substrate is a film coating the first surface. In some embodiments, the device may include a transparent adhesive layer between the first surface and the transparent second substrate. In some embodiments, the first surface contains an image that is visible through the transparent second substrate.

In some embodiments, a system may be provided. In some embodiments, the system may include a physical authentication device as disclosed herein. In some embodiments, the system may include a first processor operably coupled to an NFC receiver, a light source configured to emit at least one wavelength of light configured to activate each rare earth phosphor of the physical authentication device, and a camera.

In some embodiments, the first processor may be configured to: (1) receive a first transmission from the physical authentication device, the first transmission comprising first information; (2) cause the light source to emit a first wavelength to activate rare earth phosphors of the physical authentication device; (3) capture an image of emissions from the rare earth phosphors activated by the first wavelength, the emissions being at least one wavelength different from the first wavelength; and (4) send a second transmission comprising an encrypted message.

In some embodiments, the first processor may be further configured to: (5) identify a location of each rare earth phosphor, a type of each rare earth phosphor captured in the image and/or a location of voids in the transparent second substrate; and (6) generate a private key based on the first information, the location of each rare earth phosphor, the type of each rare earth phosphor, and/or the location of voids, and (7) create an encrypted message using the private key.

In some embodiments, the system may include an authentication processor remotely located from the first processor, where the authentication processor may be configured to: (1) receive a request comprising request information; (2) identify a public key based on the request information; and (3) transmit the public key to a remote processor.

The public key may be used for numerous tasks. As will be understood by those of skill in the art, private and public keys are used for encryption. The remote processor may be configured to use the public key to decrypt a message that was encrypted using the private key, to authenticate the message.

In some embodiments, the first processor may be further configured to send a fourth transmission after receiving the first transmission, the fourth transmission based on a location encoded in the first information. In some embodiments, the first information may include a uniform resource locator (URL) address. In some embodiments, the first information may be configured to be used as at least a portion of a query string of a uniform resource locator (URL) address.

In some embodiments, the first processor may be configured to receive a fifth transmission in response to the fourth transmission, the fifth transmission containing a request for authentication.

In some embodiments, the system may include a remote processor, where the remote processor may be configured to send a verification request to the first processor, and where the second transmission is sent to the remote processor in response to the verification request.

BRIEF DESCRIPTION OF DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1A:
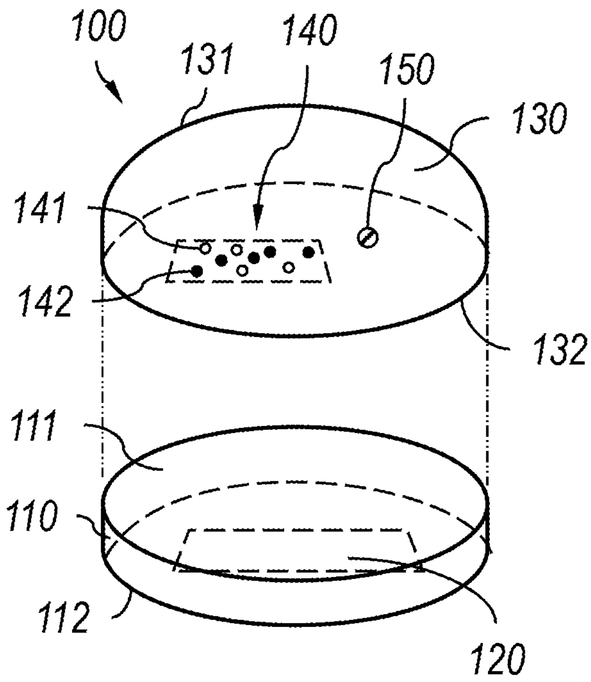
FIG. 1A is an exploded illustration of an embodiment of a physical authentication device.

Referring to FIG. 1A, in some embodiments, a physical authentication device 100 may include a first substrate 110 having a first surface 111 and a second surface 112. The first surface may face in an opposite direction from the second surface.

In some embodiments, an NFC circuit 120 may be coupled to the first substrate. In some embodiments, the NFC circuit may include an NFC chip, coupled to an antenna and optionally a capacitor. Such NFC circuits are well understood in the art. Various NFC circuits are disclosed, e.g., in U.S. Pat. No. 9,520,638 and Buchmeier et al., "Optimized NFC Circuit and Coil Design for Wireless Power Transfer with 2D Free-Positioning and Low Load Sensibility", Sensors (Basel), 2021 Dec. 2; 21 (23): 8074, both of which are incorporated by reference herein.

In some embodiments, the NFC circuit is embedded in the first substrate. In some embodiments, the NFC circuit is at least partially on the second surface 112. In some embodiments, the NFC circuit is at least partially on the first surface 111.

The NFC circuit may be configured to transmit first information. The NFC circuit may be configured to transmit the first information using any appropriate protocol as known to those of skill in the art.

In some embodiments, the first information may include a uniform resource locator (URL) address. In some embodiments, the first information may include data (such as a text field) configured to be used as at least a portion of a query string of a uniform resource locator (URL) address.

In some embodiments, the device may include a transparent second substrate 130. The transparent second substrate may include a top surface 131 and a bottom surface 132. The bottom surface may be configured such that at least a portion is coupled, either directly or indirectly, to the first surface 111 of the first substrate. As used herein, the term "transparent" refers to a material that has at least 80%, and preferably at least 90% transmittance of all wavelengths of 400-940 nm, and preferably 380-1000 nm.

In some embodiments, the first surface 111 of the first substrate is substantially flat and the transparent second substrate 130 is an acrylic cabochon with a convex obverse (e.g., top surface 131) and a flat reverse (e.g., bottom surface 132), the flat reverse facing the first surface.

Figure 1B:
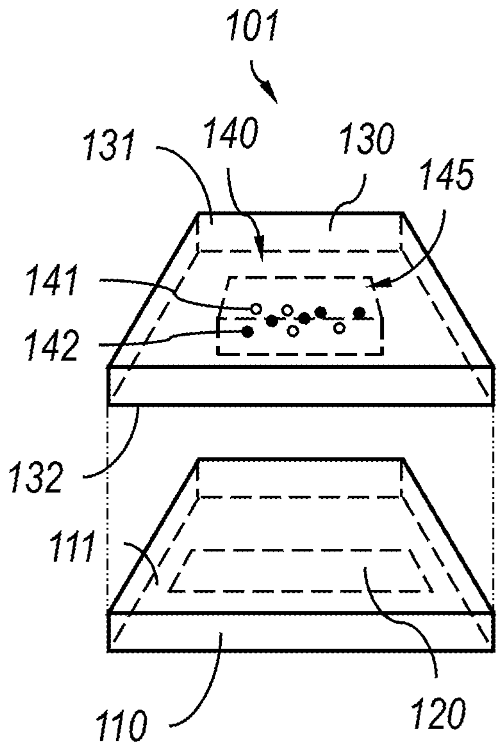
FIG. 1B is an exploded illustration of an embodiment of a physical authentication device.

Other shapes and configurations of the device are envisioned. For example, referring briefly to FIG. 1B, in some embodiments, the device 101 may have a first surface of the first substrate 120 that is substantially flat, and the transparent second substrate 130 is in the form of a film coating the first surface, such that the top surface 131 and bottom surface 132 are substantially flat as well.

In some embodiments, a plurality of rare earth phosphors 140 may be positioned within the transparent second substrate (see FIG. 1B) or between the first substrate and the transparent second substrate (see FIG. 1A). Each rare earth phosphor may be configured to emit at least one wavelength of light when irradiated with an irradiating wavelength of light (such as a near-infrared (NIR) wavelength, and preferably a 940 nm wavelength of light), the irradiating wavelength being different from the at least one wavelength of light emitted by the phosphor.

In some embodiments, the plurality of rare earth phosphors 140 may include a plurality of phosphor types 141, 142. In some embodiments, each phosphor is an up-converting phosphor. In some embodiments, one or more phosphors are down-conversion phosphors. Non-limiting examples of phosphors that may be utilizes are described in U.S. Pat. No. 9,181,477 B2, the entirety of which is incorporated by reference herein.

In some embodiments, each rare earth phosphors may be positioned randomly within the entire volume of the transparent second substrate, or within less than the entire volume (e.g., the phosphors are present only within a portion 145 of the entire volume defined by the transparent second substrate).

In some embodiments, each rare earth phosphors is positioned randomly between the first substrate and the transparent second substrate. In some embodiments, the rare earth phosphors are positioned randomly within defined areas between the first substrate and the transparent second substrate.

In some embodiments, the transparent second substrate may contain manufacturing defects 150. Such defects may include, e.g., voids.

Figure 1C:
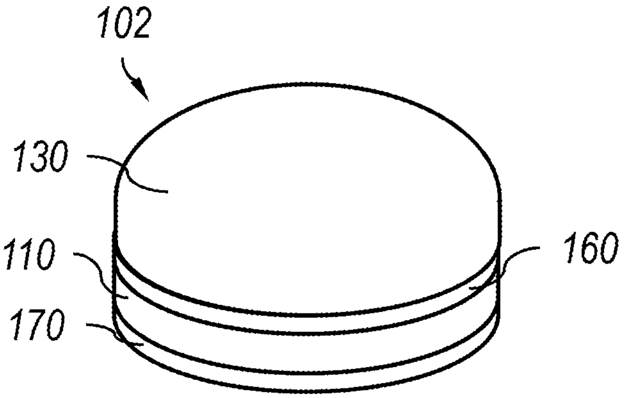
FIG. 1C is an illustration of an embodiment of a physical authentication device.

Referring to FIG. 1C, in some embodiments, the device 102 may include one or more adhesive layers 160 (such as a transparent adhesive layer) between the first surface of the first substrate 110 and the transparent second substrate 130.

In some embodiments, the device may include one or more magnets 170 coupled to the first substrate opposite the transparent second substrate. In some embodiments, this device may be configured as a whiteboard or refrigerator magnet.

In some embodiments, the first surface may display an image that is visible through the transparent second substrate.

Figure 2:
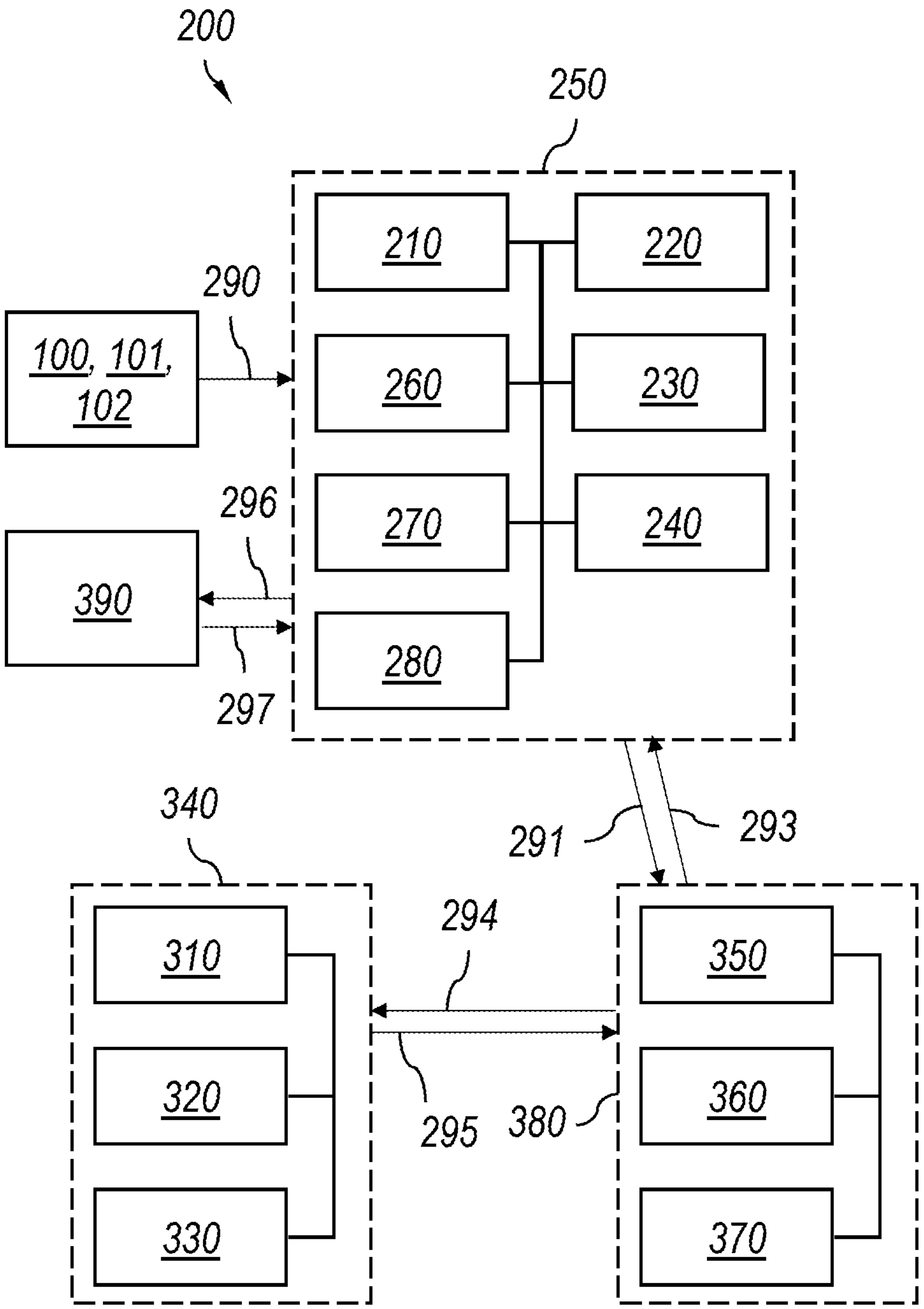
FIG. 2 is a block diagram of an embodiment of a system.

Referring to FIG. 2, in some embodiments, a system 200 may be provided.

In some embodiments, the system may include a physical authentication device 100, 101, 102 as disclosed herein.

In some embodiments, the system may include a first processor 210 operably coupled to an NFC receiver 220, a light source 230 configured to emit at least one wavelength of light configured to activate each rare earth phosphor of the physical authentication device, and a camera 240. In some embodiments, the first processor, the NFC receiver, the light source, and the camera are at least partially within a housing 250. In some embodiments, the housing is a smartphone case. In some embodiments, the first processor may be coupled to a memory 260. In some embodiments, the first processor may be coupled to a display 270.

In some embodiments, the first processor may be coupled to a non-transitory computer-readable storage medium 280 containing instructions that, when executed, configured the first processor to perform certain steps.

In some embodiments, those steps may include receiving a first transmission 290 from the physical authentication device, the first transmission comprising first information.

In some embodiments, those steps may include causing and capturing a response from the rare-earth phosphors in the device. This process may include causing the light source to emit a first wavelength, irradiating at least a portion of the device, and activating the rare earth phosphors of the physical authentication device. The camera may then capture an image of emissions from the rare earth phosphors activated by the first wavelength, the emissions being at least one wavelength different from the first wavelength. For example, in some embodiments, after being irradiated by a 980 nm wavelength, one phosphor type may emit a green wavelength, and one type may emit a red wavelength. The camera would capture both the green and red emitted light.

The steps may also include sending a second transmission (e.g., transmission 291 or 292) comprising second information, the second information comprising an encrypted message.

In some embodiments, the steps may also include, prior to sending the second transmission, first creating a private key based on the information available. In some embodiments, this may include first identifying a location of each rare earth phosphor, and a type of each rare earth phosphor captured in the image. A private key may then be generated based on the first information, the location of each rare earth phosphor, the type of each rare earth phosphor, and/or the location of voids within the transparent second substrate. Once the private key has been created, a message may be encrypted using the private key. In some embodiments, the message may include a unique identifier encrypted using the private key, that can be decrypted using a previously-created public key that is available to a remote processor.

In some embodiments, the system may include an authentication processor 310 remotely located from the first processor, where the authentication processor may be coupled to a memory 320 and a non-transitory computer-readable storage medium 330 containing instructions that, when executed, configured the authentication processor to perform certain steps. In some embodiments, the authentication processor may be configured to receive a request for a public key (e.g., via transmission 294). The authentication processor could then look in a database, blockchain, etc., and identify the appropriate public key. That key would then be sent (e.g., via transmission 295) to a remote processor.

In some embodiments, the authentication processor 310 may be present in a housing 340, such as a server cabinet.

In some embodiments, the system may include a remote processor 350. The remote processor may be coupled to a memory 360, and a non-transitory computer-readable storage medium 370 containing instructions that, when executed, configured the remote processor to perform certain steps. In some embodiments, those steps may include sending a verification request to the first processor (e.g., via transmission 293). In some embodiments, the second transmission (e.g., transmission 291) may be sent to the remote processor in response to the verification request. The remote processor may be configured to decrypt the message present in the second transmission. In some cases, that decrypted message would be used as a form of authentication.

In some embodiments, the remote processor 350 may be present in a housing 380, such as a server cabinet.

In some embodiments, the first processor may be further configured to send a fourth transmission (e.g., transmission 296) to a remote server 390 after receiving the first transmission, the fourth transmission based on a location encoded in the first information. For example, in some embodiments, the first information contains a text field (e.g., "interesting_thing". The first processor may form a concatenated URL by taking a predefined URL (e.g., "somewhere.net") and adding the text field as a query string (e.g., "somewhere.net?interesting_thing"). The first processor may then use a web client to attempt to retrieve whatever data is available at the concatenated URL. In some embodiments, the remote server 390 is distinct from the remote processor 350. In some embodiments, the remote server 390 may include the remote processor 350.

In some embodiments, the first processor may be configured to receive a fifth transmission (e.g., transmission 297) in response to the fourth transmission, where the fifth transmission containing a request for authentication. In some embodiments, the fifth transmission could include additional information that could be utilized as part of the encrypted message for use in authenticating a response.

In some embodiments, a system for transferring non-fungible tokens may be provided. Such non-fungible tokens may include, e.g., photos or videos.

Figure 3A:
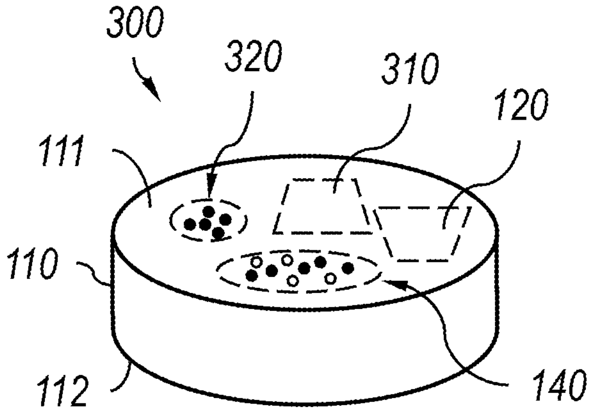
FIG. 3A is an illustration of a physical authentication device.

The system may include a physical authentication device as disclosed herein. Referring to FIG. 3A, in some embodiments, the physical authentication device may include a first substrate 110 having a first surface 111 and a second surface 112. In some embodiments, the physical authentication device may include an NFC circuit 120 and/or a three-dimensional barcode 310 coupled to the first substrate. The three-dimensional barcode and/or an NFC circuit may provide first information, the first information including a first unique code associated with the physical authentication device.

Referring to FIG. 2 (where the physical authentication device 100, 101, 102 may be physical authentication device 300), the system may include a first processor 210 configured to receive an image of the three-dimensional barcode and/or first information transmitted from the NFC circuit. The first processor may then be configured to open a website defined by the first information as disclosed herein. The first processor may then receive a request for authentication of a first user associated with the first processor. The first processor may then be configured to send authentication information to the second processor in response to the request for authentication.

The system may include a second processor 350. The second processor may be configured to determine if the first user is allowed access based on the authentication information, and then determine an action to be allowed. The action to be allowed may be determined based on the authentication information and data in a database coupled to the second processor.

In some embodiments, when the physical authentication device is configured to be uniquely associated with only a single non-fungible token, and the first user is not the owner of the single non-fungible token, the second processor may make a determination to allow ownership of the single non-fungible token to be transferred to the first user.

For example, if a user buys a physical authentication device from a store, that physical authentication device that is configured to be associated with only a single, specific, unique non-fungible token. When the user scans the barcode and/or NFC tag on the authentication device with his or her phone, and enters his or her authentication information, the second processor may determine that the database does not list a user associated with the physical authentication device, and therefore the user is authorized to own the single specific unique NFT. The second processor may allow the user to request ownership, or may automatically send the request to an appropriate blockchain system. In some embodiments, the second processor may the store the user information in the database associated with that single, specific, unique non-fungible token.

In some embodiments, when the physical authentication device is configured to be associated with a plurality of non-fungible tokens, the second processor may make a determination to allow one or more non-fungible tokens (which may or may not have been minted as NFTs on a blockchain yet) from the first user to be associated with the physical authentication device.

For example, if a family member takes several photographs of an athlete playing a game, that family member may scan a barcode or NFC tag of a physical authentication device that is associated with the athlete in the database coupled to the second processor. The second processor may recognize that the physical authentication device is configured to have a device type that is configured to be associated with multiple non-fungible tokens, and once the family member enters their authentication information into the system, may allow the family member to associate one or more photographs of the athlete with the athlete's physical authentication device.

In some embodiments, the system may be configured to mint a new non-fungible token on a blockchain-based system, the new non-fungible token based on a image or video received from the first user.

In some embodiments, the second processor is configured to send a request to transfer ownership of one or more non-fungible tokens to the owner of the physical authentication device, the owner being identified in a database operably coupled to the second processor.

In some embodiments, determining the action to be taken may include allowing a reduced-quality version of the non-fungible token to be displayed. In some embodiments, the second processor is configured to, when the physical authentication device is configured to be uniquely associated with only a single non-fungible token, and the first user is the owner of the single non-fungible token, allowing the first user to display the single non-fungible token.

In some embodiments, the action to be taken may include sending a request to the owner of the physical authentication device to allow the single non-fungible token to be transferred, or to allow the plurality of non-fungible tokens to be associated with the physical authentication device.

Figure 3B:
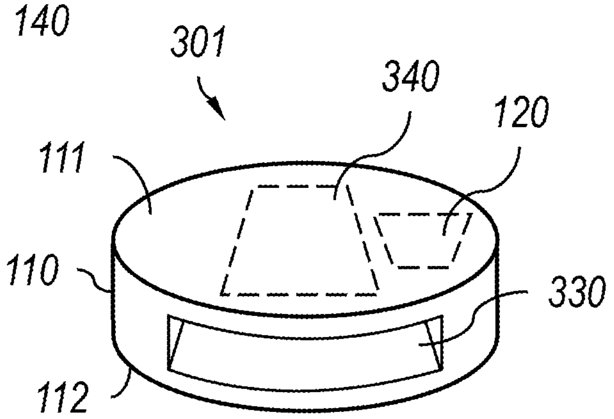
FIG. 3B is an illustration of a physical authentication device with a slot.

In some embodiments, the third information used to authenticate comprises a captured image of at least part of the physical authentication device. For example, in some embodiments, the second processor may require a picture of a first surface of the physical authentication device. In some embodiments, the at least part of the physical authentication device includes a unique visual pattern defined on the first surface. In some embodiments, the image includes at least part of a visually unique substrate removably coupled to the first substrate. Referring to FIG. 3B, in some embodiments, a visually unique substrate may be inserted into a slot 330 on the first substrate. In some embodiments, the visually unique substrate may be visible through a visibly transparent window 340. In some embodiment, the first substrate is transparent, or comprises a transparent layer to allow the visually unique substrate to be seen. In some embodiments, the visually unique substrate comprises artwork. In some embodiments, the visually unique substrate comprises a banknote. In some embodiments, the image includes a serial number on the banknote.

The image of the visually unique substrate may be compared to information in the database as part of the authentication process. The visually unique substrate should match an image of visually unique substrate stored in the database.

Referring to FIG. 3A, in some embodiments, the physical authentication device may include a plurality of rare earth phosphors 140 in at least one location that is coupled to the first surface (or, as seen in FIG. 1A, within a transparent second substrate coupled to the first substrate, or between the first substrate and the transparent second substrate). Each rare earth phosphor configured to emit at least one visible wavelength of light in response to being irradiated with an irradiating wavelength of light, the irradiating wavelength being different from the at least one visible wavelength of light. In some embodiments, rare earth phosphors 320 in a second location may also be present. In some embodiments, the phosphors 140 in one location may be the same as phosphors 320 in a second location. In some embodiments, the phosphors 140 in one location may be different from the phosphors 320 in the second location.

In some embodiments, the third information for authentication may include a captured image of the plurality of rare earth phosphors while the plurality of rare earth phosphors are emitting the at least one visible wavelength of light and a captured image of at least part of the physical authentication device while the rare earth phosphors are not emitting the at least one visible wavelength of light. In this way, the second processor may use the captured images to verify authenticity. For example, if the phosphors 140 in a first location do not match the identify of phosphors that are listed in the database for that first location, no transaction would be allowed.

Figure 3C:
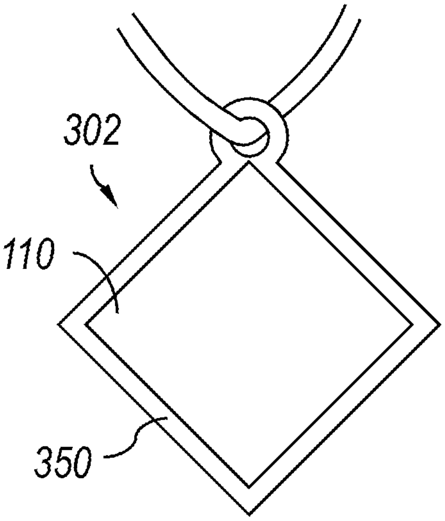
FIG. 3C is an illustration of a physical authentication device coupled to jewelry.

Referring to FIG. 3C, in some embodiments, the physical authentication token is jewelry, or is configured to be attached to jewelry, accessories, clothing, or a body part. In some embodiments, the physical authentication token is configured to be attached to a pet collar.

In some embodiments, a system for establishing ownership of a non-fungible token is provided. The system may include a physical authentication device may include (1) a first substrate having a first surface and a second surface; and (2) a three-dimensional barcode and/or an NFC circuit coupled to the first substrate, the three-dimensional barcode and/or an NFC circuit containing first information, the first information including a first unique code associated with the physical authentication device. The device may include other components as disclosed herein.

The system may include a remote processor operably communicating with a database, the database configured to associate the first unique code with at least one non-fungible token. The remote processor may be configured to require multi-factor authentication, wherein at least one factor of the multi-factor authentication process is a characteristic of the physical authentication device. For example, in some embodiments, the characteristic is the first information. In some embodiments, the characteristic may include the visual appearance of a surface of the device. In some embodiments, the characteristic may include the emission spectra and location of phosphors on a surface of the device. In some embodiments, the characteristic includes defects in the manufacturing process. In some embodiments, the characteristic includes other serial numbers or codes printed on a surface of the device, or on a substrate coupled to the device.

Figure 4A:
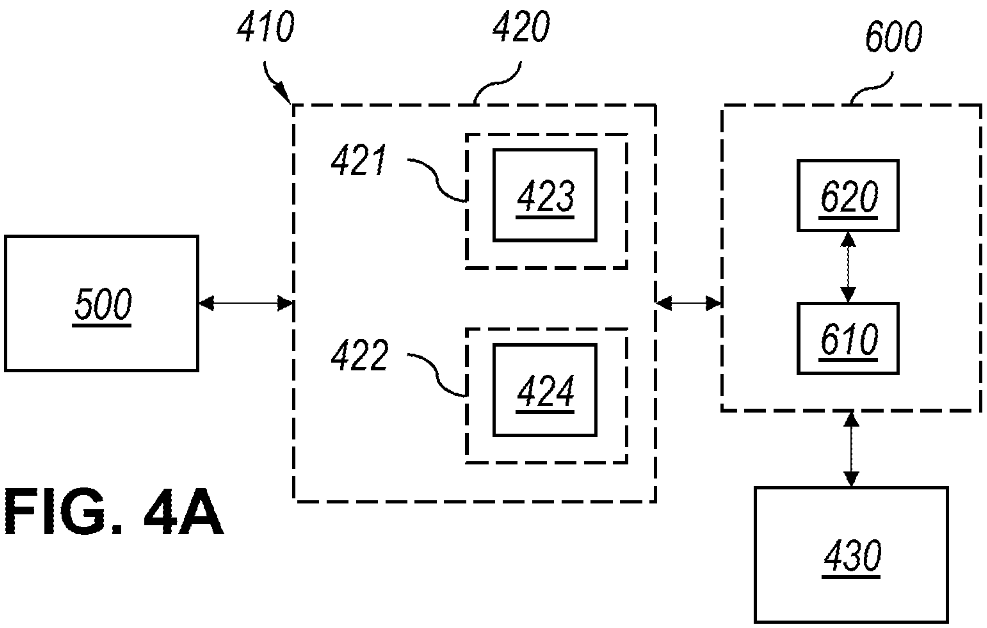
FIGS. 4A and 4B are a simplified block diagrams of embodiments of a system.

Referring to FIG. 4A, in some embodiments, a system 410 for collaborative sharing may include one or more physical access devices 500 for sharing.

Figure 5:
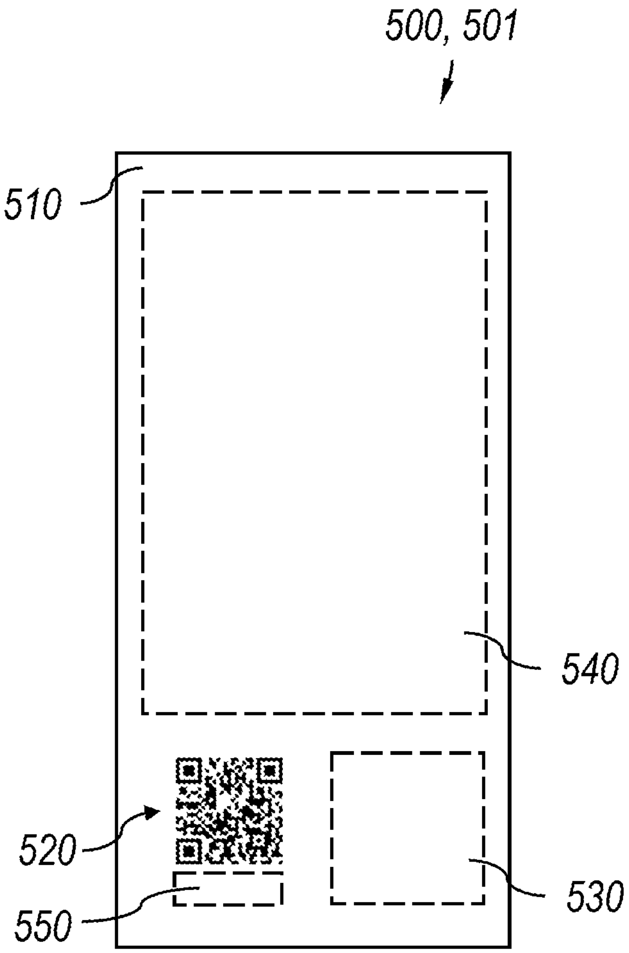
FIG. 5 is an illustration of an embodiment of a physical access device.

Referring to FIG. 5, each physical access device 500, 501 may include a first substrate 510. Each physical access device may include a three-dimensional barcode 520 and/or an NFC circuit 530 coupled to the first substrate. They may be printed on, adhered on, or any other appropriate method for coupling the barcode and/or NFC circuit to the first substrate.

The physical access device may have a phosphor region 550 wherein at least one rare earth phosphor may be disposed, e.g., on or in the first substrate 510. (including, e.g., in a coating disposed over the first substrate). In some embodiments, each phosphor is an upconverting phosphor. In some embodiments, each phosphor may be configured to absorb a first wavelength of light. In some embodiments, the phosphor(s) disposed on or in the first substrate may include a plurality of rare earth phosphors. Each rare earth phosphor may be configured to emit at least one wavelength of light when irradiated with an irradiating wavelength of light, the irradiating wavelength being different from the at least one wavelength of light it emits. In some embodiments, the phosphors region is separate from other regions. In some embodiments, the phosphor region overlaps at least a portion of another component, such as the NFC circuit or the barcode. For example, in some embodiments, the barcode could be printed with an ink inclusive of the phosphor(s).

The three-dimensional barcode, NFC circuit, and/or phosphor(s) should be configured to provide first information (e.g., via encoding the information in the barcode, encoding the information in memory on an NFC circuit, encoding the information in the pattern and identification of phosphors on the substrate, etc.).

The first information may include a first code. The first code may be unique to the physical access device. For example, the physical access device may have a code that is unique to that specific access device. Alternatively, the first code may be unique to an event, location, or object. For example, multiple access devices could have a code that is unique to, e.g., a wedding, a party, a graduation, a sporting event, a conference, etc.

In some embodiments, the code is in several parts—for example, a visual-light barcode may provide a first part of a code, and the phosphor location and identification providing a second part of the code. For example, a visual-light barcode could encode one or more characters of a long passcode, and the phosphor emissive spectrum and location of each phosphor may encode one or more additional characters such that, when concatenated, provide a complete code. Alternatively, information from the phosphor(s) may indicate how to modify the code from the barcode (for example, the phosphors may encode information indicating which decoding algorithm to use on the information provided by the barcode to get the correct code).

In some embodiments, the physical access device may have a visible region 540 configured to provide information to a reader, such as instructions for use, details about the event, location, or object, etc.

Referring to FIG. 4A, in some embodiments, the system may include a remote server 600. The remote server may include a processor 610. As will be understood, the processer may be coupled to memory and a computer-readable storage medium 620. The computer-readable storage medium may contain instructions that, when executed by the processor, configured the processor in specific ways. In some embodiments, the processor 610 may be configured to receive one or more files from a plurality of electronic devices 420. In some embodiments, the processor 610 may be configured to automatically associate each of the one or more files with the physical access device or the event, location, or object.

In some embodiments, the system may include a plurality of electronic devices 420, where each electronic device 421, 422 including a processor 423, 424. As will be understood, the processer may be coupled to memory and a computer-readable storage medium (not shown). The computer-readable storage medium may contain instructions that, when executed by the processor, configured the processor in specific ways. The processor 423, 424 may be configured to receive an image of the barcode, an image of the phosphors, and/or a transmission from the NFC circuit. In some embodiments, the processor may be configured to receive one or more images of the phosphor(s) disposed in or on the first substrate, while the phosphor(s) are emitting light.

The processor 423, 424 may be configured to determine the first information based on the image and/or transmission. The processor 423, 424 may be configured to access the remote server based on the first information. The processor 423, 424 may be configured to send one or more files to the remote server.

In FIG. 4A, the system is shown as including a single, unique physical access device 500. Preferably, in this configuration, this physical access device may be associated (e.g., in a database on computer-readable storage medium 620) with a single owner.

Figure 4B:
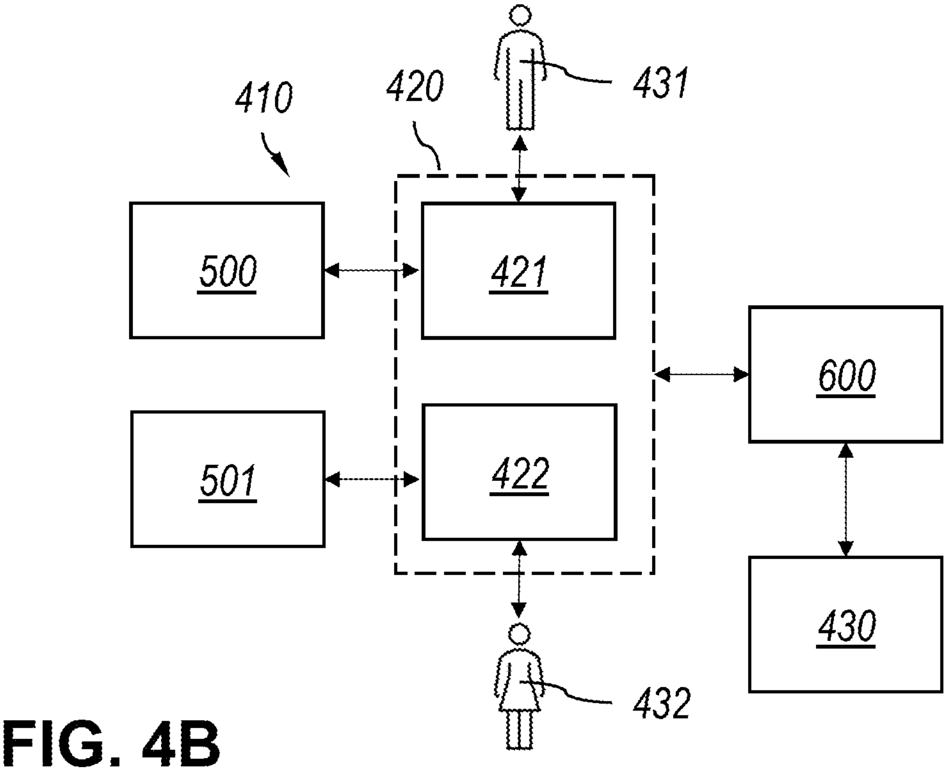

In FIG. 4B, it can be seen that in some embodiments, multiple physical access devices 500, 501 may be utilized. In some embodiments, there is a 1:1 correlation between physical access devices 500, 501 and electronic devices 421, 422. Preferably, when multiple physical access devices are utilized, each physical access devices may be associated (e.g., in a database on computer-readable storage medium 620) with a single event, location, or object.

Referring to FIG. 4B, in some embodiments, the first code may be unique to an event, location, or object. In such embodiments, the one or more physical access devices may include a plurality of physical access devices 500, 501, each physical access device being provided to one of a plurality of users 431, 432. In some embodiments, the first substrate is an invitation to attend an event, an entrance ticket, or a label.

In some embodiments, the processor on the remote server 600 may be configured to receive approval from each of the plurality of users 431, 432 that all images and/or videos captured under predefined conditions on an electronic device 421, 422 associated with that user will be sent to the remote server, and/or may be configured to receive all images and/or videos captured under the predefined conditions.

In some embodiments, the predefined conditions include a date, time, location, or combination thereof. For example, a geofence could be set up around a sporting arena, where a game is scheduled to occur in a time window from, e.g., 7 pm until 10 pm. Any image or video captured during that time window by a device that is determined to be within the geofenced area may be sent to the remote server. Once a user 431, 432 holding their device 421, 422 moves outside the geofenced area, or when outside the time window, the device will no longer send images or video to the remote server. In some embodiments, the time window and geofenced area or location are displayed to each user prior to receiving approval from the user.

In some embodiments, the remote server may be configured to allow each of the plurality of users 431, 432 to view any and all images and/or videos received by the remote server under the predefined conditions that are associated with the same event that each user contributed images and/or videos to. In some embodiments, the images and/or videos may be displayed on the user's device 421, 422. In some embodiments, the images and/or videos may be sent to an additional remote processor 430 (such as a processor on a desktop or laptop computer, etc.) where a user may display the images and/or videos.

In some embodiments, the processor on each electronic device 420, 421 may be configured to determine if the predefined conditions are met.

In some embodiments, the processor on each electronic device may be configured to automatically send an image and/or video to the remote server when the image and/or video is captured while predefined conditions are met.

In some embodiments, the processor on each electronic device may prompt the user to select one or more images and/or videos to send to the remote processor. When allowing users to select photos to send to the remote processor, in some embodiments the remote processor may use metadata to determine if each photo satisfies any predetermined conditions before associating the photo with a given event, location, or object.

In some embodiments, the remote processor may be configured to use image recognition to compare a newly received image or video with images or video previously associated with the event, location, or object. For example, if a user is attending a wedding, and the host of the event has selected that only pictures that include the bride and groom should be captured by the remote processor, the remote processor may be configured to use facial recognition techniques to determine if the bride and/or groom is present in an image or video, before associating the newly received image and/or video with the wedding.

In some embodiments, the remote processor may be configured to associate each received image and/or video with a user and/or electronic device that sent the image and/or video.

In some embodiments, the remote processor may be configured to present a slideshow of all received images and/or videos associated with the event, location, or object to a user 431, 432 upon request.

Referring to FIG. 4A, in systems where the first code is unique to the physical access device, the one or more physical access devices generally includes only a single physical access device. In some embodiments, each processor on the electronic devices may be configured to allow a user to graphically select one or more images and/or videos, and then send the selected one or more images and/or videos to the remote server.

In some embodiments, the remote processor may be configured to use image recognition to compare a newly received image or video with images or video previously associated with the physical access device. For example, if the physical access device belongs to an athlete, and the athlete has requested that only images of the athlete be saved if the athlete is shown actively participating in a game, the remote processor may be configured to use image recognition techniques to determine if the athlete is present in the image and/or video, and/or determining if the athlete is actively participating in a game, before associating the newly received image and/or video with the physical access device.

In some embodiments, the physical access device may be jewelry, or may be configured to be attached to jewelry, accessories, clothing, or a body part. In some embodiments, the physical access device may be a coaster (such as a drink coaster), a phone case or grip, or a component on a beverage container (such as a wine bottle or liquor bottle), In some embodiments, the physical access device may be associated with a specific object, i.e., memorabilia and photographs of the history, and the device may allow additional photographs to be associated with the specific object.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A system for collaborative sharing, comprising:

one or more physical access devices, each physical access device of the one or more physical access devices comprising:

a first substrate;

a plurality of rare-earth phosphors in or on the first substrate; and a three-dimensional barcode and/or a near field communication (NFC) circuit coupled to the first substrate, a plurality of electronic devices, wherein each electronic device of the plurality of electronic devices is a smartphone associated with a user and wherein each electronic device of the plurality of electronic devices including an electronic device processor, each electronic device processor configured to:

cause an image of the three-dimensional barcode to be captured or a transmission from the NFC circuit to be received;

determine a first information based on that captured image or received transmission, wherein the first information includes a first code that is unique to its respective physical access device of the one or more physical access devices or unique to an event, location, or object;

cause an authentication image to be captured, wherein the authentication image is an image of the plurality of rare-earth phosphors emitting at least one visible wavelength captured after each electronic device of the plurality of electronic device has interacted with one of the one or more physical access devices;

generate a private key based on one or more of the first information, location of each rare earth phosphor, and type of each rare earth phosphors;

encrypt the authentication image based on the private key to determine encrypted authentication image;

access a remote server based on the first information;

send the encrypted authentication image to the remote server; and send one or more files to the remote server;

the remote server comprising a processor configured to:

receive the encrypted authentication image from each electronic device of the plurality of electronic devices, decrypt the encrypted authentication image using public key;

authenticate each electronic device of the plurality of electronic devices based on the authentication image;

receive the one or more files from the first plurality of electronic devices; and automatically associate each of the one or more files from each authenticated device of the plurality of electronic devices with the respective physical access device of the one or more physical access devices wherein the one or more files are images and/or video.

2. The system according to claim 1, wherein the first code is unique to the event, location, or object;

wherein the one or more physical access devices comprises a plurality of physical access devices, each physical access device being provided to one of a plurality of users; and wherein the processor on the remote server is further configured to:

receive approval from each of the plurality of users that all images and/or videos captured under predefined conditions will be sent to the remote server;

receive all images and/or videos captured under the predefined conditions; and allow each of the plurality of users to view all images and/or videos received under the predefined conditions.

3. The system according to claim 2, wherein each electronic device processor is further configured to:

determine when the predefined conditions are met, wherein the predefined conditions include a date, time, location, or combination thereof; and automatically send all images and/or videos to the remote server while the predefined conditions are met.

4. The system according to claim 2, wherein the processor on the remote server is further configured to associate each received image and/or video with a user and/or electronic device that sent the image and/or video.

5. The system according to claim 2, wherein the first code is unique to the physical access device; wherein the one or more physical access devices comprises a single physical access device; and wherein each electronic device processor is further configured to: allow a user to graphically select one or more images and/or videos; send the selected one or more images and/or videos to the remote server.

6. The system according to claim 1, wherein the one or more physical access device is jewelry, or is configured to be attached to jewelry, accessories, clothing, or a body part.

7. The system according to claim 1, wherein there is a 1:1 ratio of physical access devices to electronic devices.

* * * * *